(12) United States Patent
Kalidindi et al.

(10) Patent No.: US 7,406,683 B2
(45) Date of Patent: Jul. 29, 2008

(54) SYSTEM AND METHOD PROVIDING FOR INTERACTION BETWEEN PROGRAMMING LANGUAGES

(75) Inventors: Satish Kumar Kalidindi, Morrisville, NC (US); Carl Linder, Cary, NC (US); Rajeev Madan, Durham, NC (US); Kai Wang, Cary, NC (US); Jianren Yang, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 510 days.

(21) Appl. No.: 11/070,015

(22) Filed: Mar. 2, 2005

(65) Prior Publication Data

US 2006/0200808 A1 Sep. 7, 2006

(51) Int. Cl.
G06F 9/45 (2006.01)
(52) U.S. Cl. .................. 717/137; 717/139; 717/146
(58) Field of Classification Search ......... 717/106–108, 717/136–148
See application file for complete search history.

(56) References Cited

U.S. PATENT DOCUMENTS

| | | | | |
|---|---|---|---|---|
| 5,241,450 A | * | 8/1993 | Bernhardt et al. | 361/689 |
| 5,581,749 A | * | 12/1996 | Hossain et al. | 707/10 |
| 5,721,929 A | * | 2/1998 | Pasquariello | 717/168 |
| 5,960,200 A | * | 9/1999 | Eager et al. | 717/147 |
| 5,983,019 A | * | 11/1999 | Davidson | 717/139 |
| 6,279,124 B1 | | 8/2001 | Brouwer et al. | 714/38 |
| 6,334,158 B1 | * | 12/2001 | Jennyc et al. | 719/328 |
| 6,549,882 B1 | | 4/2003 | Chen et al. | 703/21 |
| 6,587,543 B1 | | 7/2003 | Howard et al. | 379/10.01 |
| 6,587,969 B1 | | 7/2003 | Weinberg et al. | 714/46 |
| 6,658,652 B1 | * | 12/2003 | Alexander et al. | 717/128 |
| 6,804,796 B2 | | 10/2004 | Gustavsson et al. | 714/38 |
| 6,826,746 B2 | | 11/2004 | Evans et al. | 717/124 |
| 2002/0144003 A1 | * | 10/2002 | Jin | 709/310 |
| 2003/0004697 A1 | * | 1/2003 | Ferris | 703/13 |
| 2003/0217352 A1 | * | 11/2003 | Ueno et al. | 717/115 |
| 2004/0268309 A1 | * | 12/2004 | Grover et al. | 717/120 |
| 2005/0050525 A1 | * | 3/2005 | Chittar et al. | 717/136 |

OTHER PUBLICATIONS

Paul J. Perrone, Venkata S. R. "Krishna" R. Chaganti, Building Java Enterprise Systems with J2EE, Sams, Jun. 7, 2000.*

* cited by examiner

*Primary Examiner*—Ted T Vo
(74) *Attorney, Agent, or Firm*—Baker Botts L.L.P.

(57) ABSTRACT

Interaction between programming languages includes receiving a command from a user, where the command is written in a first programming language. The first programming language is converted to an intermediate language. Translations are performed between the intermediate language and a second programming language to provide interaction between the first and second programming languages.

21 Claims, 3 Drawing Sheets

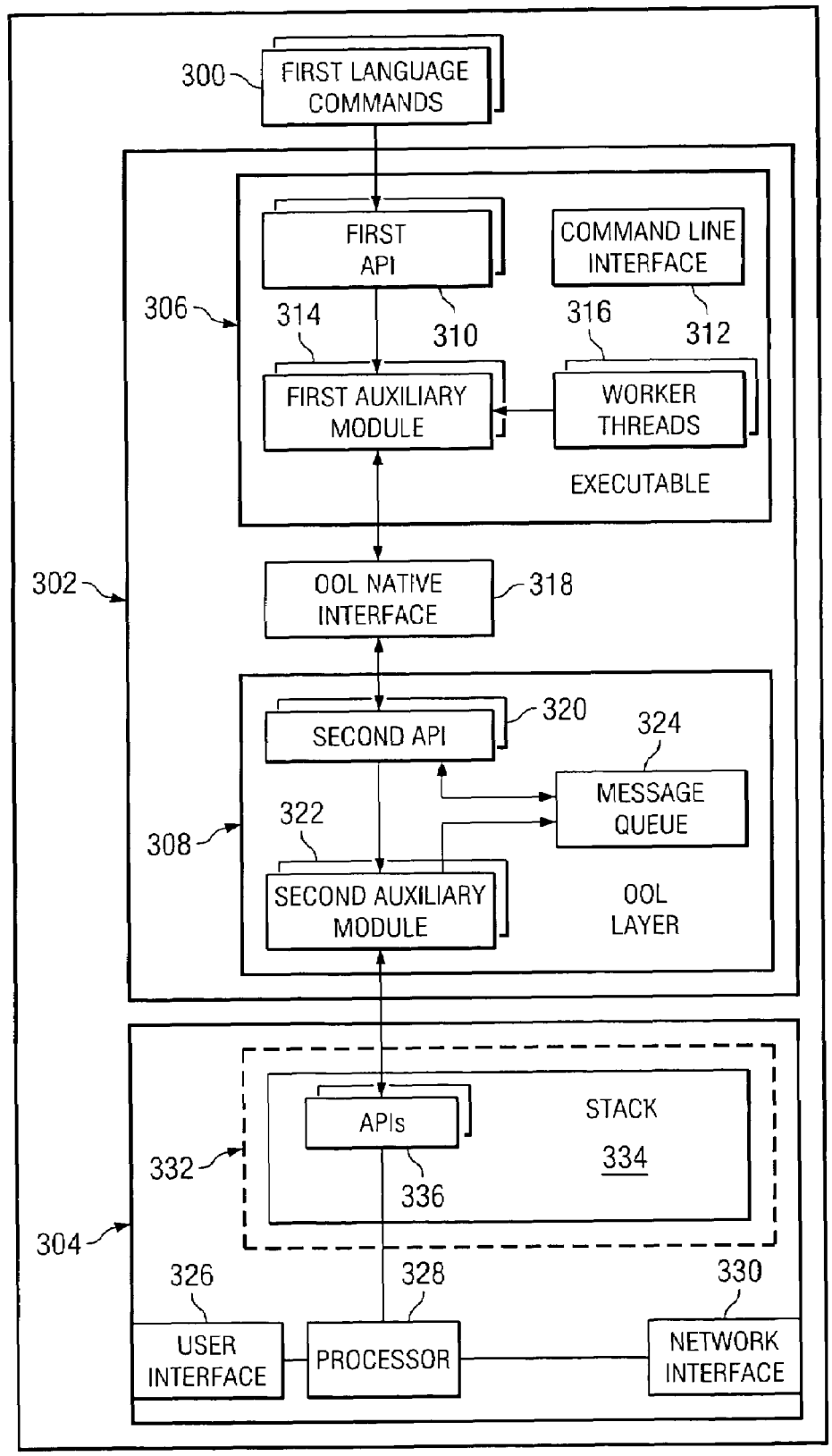

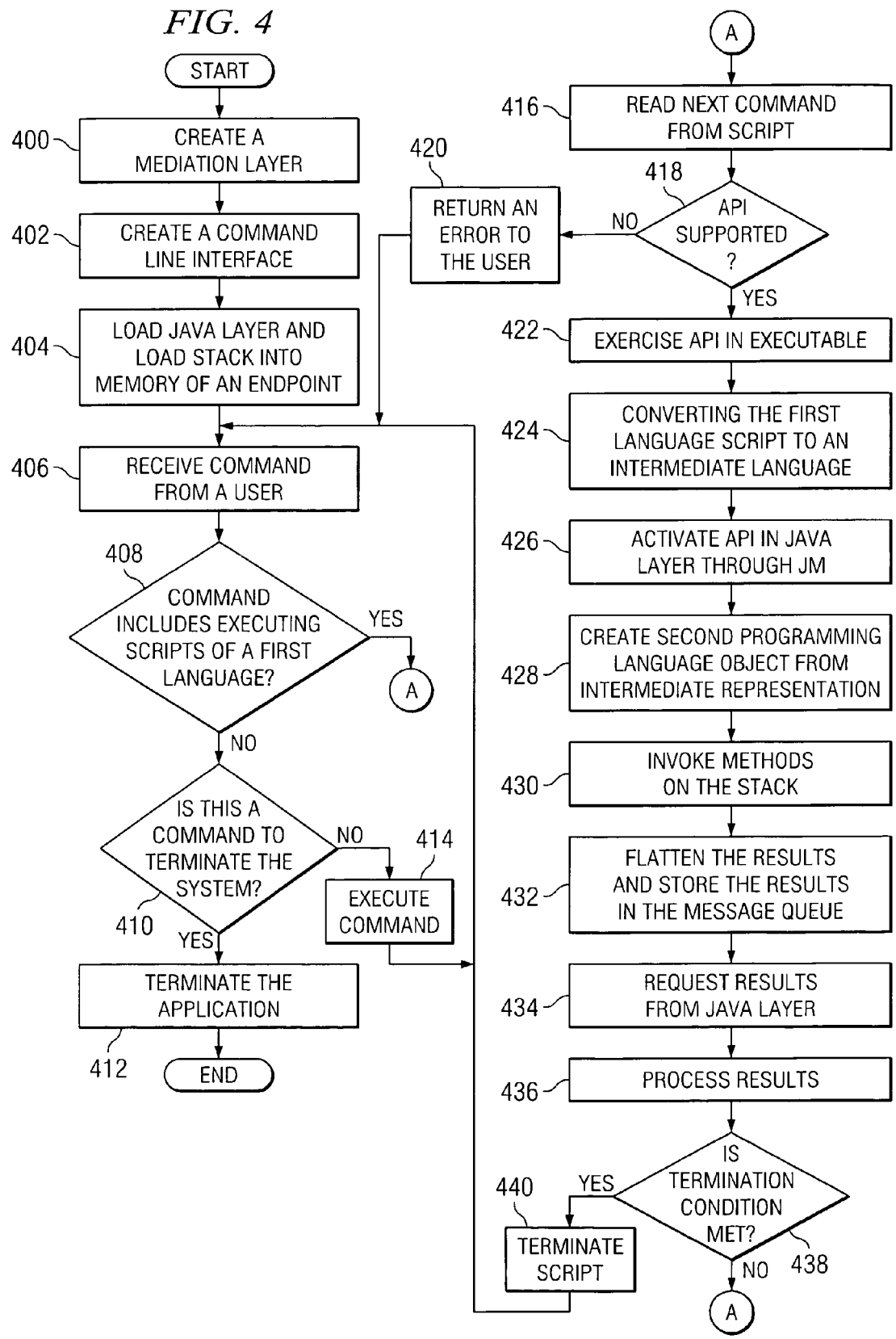

SYSTEM AND METHOD PROVIDING FOR INTERACTION BETWEEN PROGRAMMING LANGUAGES

TECHNICAL FIELD OF THE INVENTION

This invention relates generally to the field of telephony applications and more specifically a system and method providing for interaction between programming languages.

BACKGROUND

Legacy telephony applications have been based upon a structured language, such as C. The legacy telephony applications have existed within an entire system, such as a traditional circuit based Public Branch Exchange. However, recent developments in both software and hardware have lead to the development of telephony solutions that comprise a number of different language applications, which are not compatible with the legacy telephony applications. These applications may be based on a number of different languages, such as C, Java, or C++.

SUMMARY OF THE DISCLOSURE

In accordance with the present invention, a system and method providing for interaction between programming languages are provided that substantially eliminate or greatly reduce disadvantages and problems associated with previously developed systems and methods. In particular, the present invention contemplates a system and method providing for interaction between programming languages.

According to one embodiment of the present invention, interaction between programming languages includes receiving a command from a user, where the command is written in a first programming language. The first programming language is converted to an intermediate language. Translations are performed between the intermediate language and a second programming language to provide interaction between the first and second programming languages.

In another embodiment, a system providing for the interaction between programming languages includes a command line interface that can receive commands from a user in a first programming language. The system includes an endpoint that has a stack written in a second programming language. A mediation layer facilitates interaction between the first programming language and the endpoint written in the second programming language. The mediation layer includes an executable that receives commands from a user, an object-oriented language layer that tests the functionality of a stack by invoking methods on the stack, and an interface that facilitates interaction between the executable and the object-oriented language layer.

Certain embodiments of the invention provide one or more advantages. A technical advantage of one embodiment may include providing a common language to unify disparate systems. Unifying disparate systems provides for systematic testing processes, which ensures a consistent behavior from a quality assurance perspective. For example, a test process may be implemented for one language based application and that same test may be executed on a different language based application without modification of the test process. In this example, the quality assurance testing cycle is shortened. Other embodiments of the invention can be adapted to other programming languages that may be implemented in telephony applications. As an additional advantage, multiple language based systems may be mapped to a common language, allowing users to use the system without having to know the underlying programming language. This reduces the amount of training needed to test and maintain systems.

Certain embodiments of the invention may include none, some, or all of the above technical advantages. Other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, wherein like numerals being used for like and corresponding parts of the various drawings, in which:

FIG. 3 is a block diagram of a detailed representation of an embodiment of a system providing for interaction between programming languages;

FIG. 4 is a flowchart illustrating one embodiment of a method for interaction between programming languages.

DETAILED DESCRIPTION OF THE DRAWINGS

Figure 1:
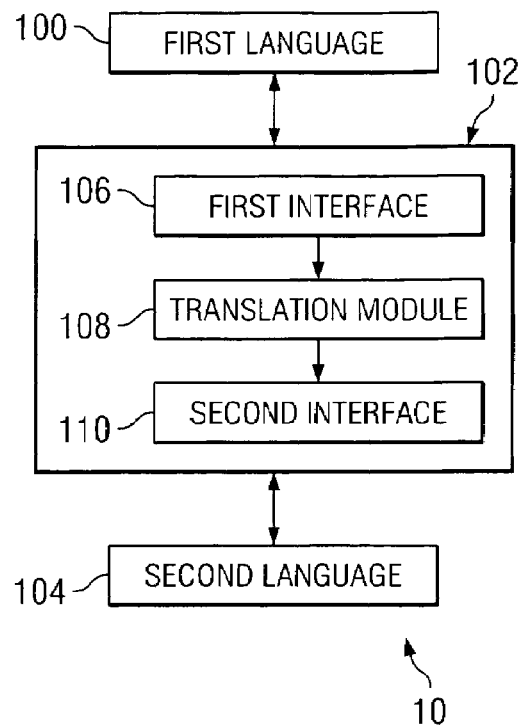
FIG. 1 is a block diagram of one embodiment of a system providing for interaction between programming languages.

FIG. 1 illustrates a system 10 that provides for interaction between programming languages. System 10 allows a user to use applications written in a programming language to interact with applications written in another programming language. In general, system 10 includes a first language 100, a mediation layer 102, and a second language 104 that combine to provide a system that allows different programming languages to interact.

First language 100 and second language 104 may include any different programming languages. First language 100 and second language 104 include a specific syntax and semantics. The syntax includes the spelling, grammar, or format of the programming language. For example, first language 100 may be a scripting language, such as Tool Command Language (TCL), and second language 104 may be an object-oriented language, such as Java, each having a different syntax and unable to communicate directly. The semantics include the instructions and commands used in a language. First language 100 and second language 104 may include any suitable combination of languages that may interact through mediation layer 102.

Mediation layer 102 processes information that performs the interaction between a first language 100 and a second language 104. In one embodiment, mediation layer 102 includes first interface 106, translation module 108, and second interface 110 that combine to implement the language interaction.

First interface 106 and second interface 110 may represent any suitable port or connection, real or virtual, including any suitable hardware, software, or combination of the preceding that allow a first language 100 and a second language 104 to exchange information with other components of system 10. First interface 106 and second interface 110 may include any suitable application programming interface (API) that facilitates the interaction between first language 100 and second language 104. First interface 106 and second interface 110 convert the syntax and semantics of the received languages into an intermediate language.

Translation module 108 translates the syntax and semantics of first language 100 and second language 104. Translation module 108 may perform translation of the syntax and semantics of first language 100 and second language 104 in any suitable manner. The syntax and semantics of first language 100 and second language 104 include the format of the language and the specific instructions and commands used in a language that allow programs to work. For example, translation module 108 executes procedures to translate first language 100 and second language 104 into a common language.

In operation, mediation layer 102 receives first language 100 and second language 104. First interface 106 and second interface 110 convert the syntax and semantics of first language 100 and second language 104, respectively, into an intermediate language. Translation module 108 performs translations on the intermediate language to implement a common language between first language 100 and second language 104.

An element of system 10 may include any suitable configuration of an interface, logic, and memory for performing the operation of the element. Logic refers to any suitable hardware, software, or combination of hardware and software. For example, logic may comprise a processor. Memory refers to any structure operable to store and facilitate retrieval of information used by a processor, and may comprise Random Access Memory (RAM), Read Only Memory (ROM), magnetic drives, disk drives, Compact Disk (CD) Drives, Digital Video Disk (DVD) drives, removal dialog storage, any other suitable data storage device, or a combination of any of the preceding.

Modifications, additions, or omissions may be made to the system without departing from the scope of the invention. For example, translation module 108 may mediate the interaction between first language 100 and second language 104 by only translating the syntax between first language 100 and second language 104 but not translating the semantics of first language 100 and second language 104. As another example, system 10 may support the interaction between programming languages for any suitable purpose and between any suitable, different programming languages. As used in this document, "each" refers to each member of a set or each member of a subset of a set.

Moreover, the operations of system 10 may be performed by more, fewer, or other modules. For example, system 10 may have one or more first interface 106 and second interface 108. The components of system 10 may be integrated or separated according to particular needs. Additionally, the operations of system 10 may be performed using any suitable logic comprising software, hardware, other logic, or any suitable combination of the preceding.

Figure 2:
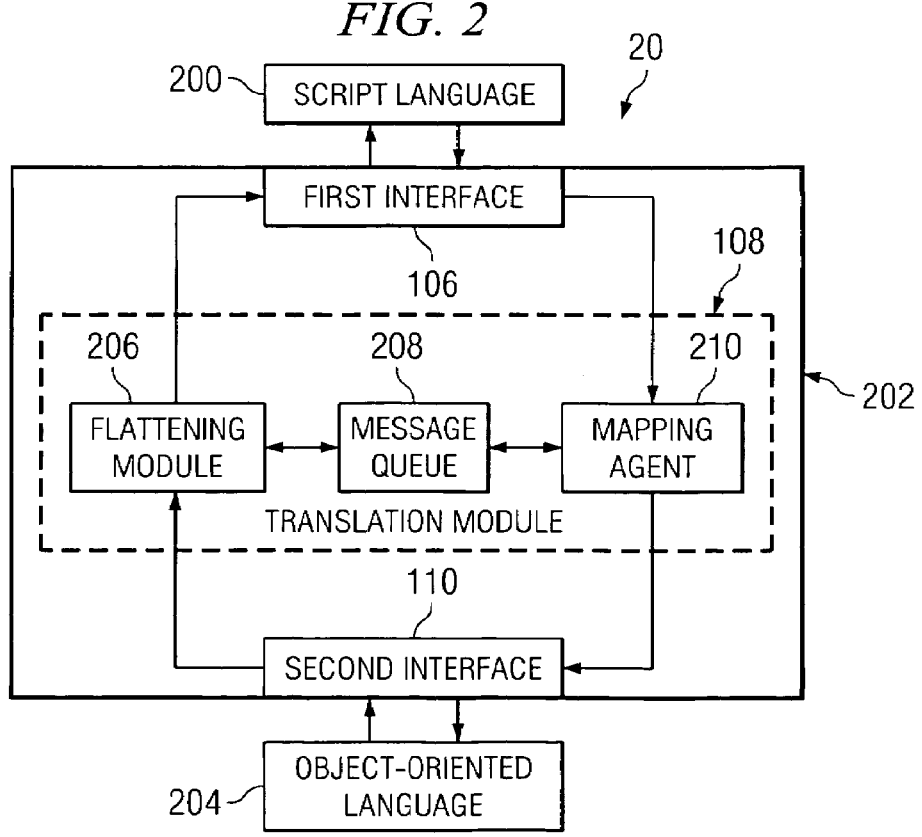
FIG. 2 is a block diagram of another embodiment of a system providing for interaction between programming languages.

FIG. 2 illustrates a system 20 that provides for interaction between programming languages. In the illustrated embodiment, system 20 facilitates the interaction between a scripting language 200 and an object-oriented language 204. To facilitate the interaction between scripting language 200 and object-oriented language 204, system 20 uses a mediation layer 202.

Scripting language 200 may include any suitable high-level programming language that is interpreted by another program while the program is executing rather than being compiled by a computer's processor. Scripting language 200 is used to write a program. Scripting language 200 may include JavaScript, Tool Command Language (TCL), Practical Extraction and Report Language (PERL), or any suitable scripting language 200.

Object-oriented language 204 may include any suitable language that combines data structures with functions operating on these data structures to create re-usable objects. Object-oriented language 204 may also include files, arrays, lists, records, or other suitable data structure. Examples of object-oriented language 204 include Java, C++, Smalltalk, or any suitable object-oriented language.

Mediation layer 202 mediates the interaction between script language 200 and object-oriented language 204. Mediation layer 202 may include first interface 106, second interface 110, and translation module 108 coupled as shown. Translation module 108 may include flattening module 206, message queue 208, and mapping agent 210 coupled as shown. First interface 106 and second interface 110 receive scripting language 200 and object-oriented language 204, respectively, and process the syntax and semantics of the languages to an intermediate language.

Translation module 108 receives the intermediate language from first interface 106 and second interface 110 and translates the syntax and semantics of the intermediate language. Within translation module 108, flattening module 206 and mapping agent 210 translate the intermediate language from first language 200 and second language 204. Flattening module 206 flattens an object from object-oriented language 204 into a series of characters that scripting language 200 can understand. Mapping agent 210 translates scripting language 200 commands into method calls that object-oriented language 204 can understand.

Message queue 208 stores the results of flattening module 206 and mapping agent 210 for later retrieval. Message queue 208 may include any suitable memory or storage that retains information for retrieval.

In operation, mediation layer 202 receives scripting language 200 at first interface 106 and object-oriented language 204 at second interface 110. At first interface 106 and second interface 110, the syntax and semantics of the received languages are converted into an intermediate language. Flattening module 206 flattens the objects of object-oriented language 204 into a series of characters that scripting language 200 can understand. Mapping agent 210 translates the intermediate language of scripting language 200 into objects that object-oriented language 204 can understand. This translation allows scripting language 200 to exercise methods on a stack of object-oriented language 204. After flattening module 206 flattens the objects of object-oriented language 204, the result is stored in message queue 208. The information stored in message queue 208 may later be retrieved.

Modifications, additions, or omissions may be made to system 20 without departing from the scope of the invention. Additionally, any suitable logic comprising software, hardware, other logic, or any suitable combination of the preceding may perform the functions of system 20.

FIG. 3 illustrates a detailed representation of a system 30 that provides for interaction between programming languages. System 30 allows a user to use applications written in one programming language to interact with telephony applications written in another programming language. In general, system 30 includes first language commands 300, a mediation layer 302, and an endpoint 304, coupled as shown, that combine to provide a system that allows first language commands 300 to interact with a different programming language.

First language commands 300 may include any appropriate scripts of scripting language. First language commands 300 that are scripts include a list of commands that may be executed. In the illustrated embodiment, first language commands 300 include tool command language (TCL) scripts. Using TCL as a common scripting language allows the implementation of a test process for first language commands 300 based application and executes that same test on a different language based application without modification of first language commands 300.

Mediation layer 302 processes information that allows for the implementation of a common language between the different programming languages interacting. In the illustrated embodiment, mediation layer 302 is implemented as a harness. The harness executes methods in the stack of an object-oriented program to verify the functionality of the stack.

The harness includes an executable 306 that controls the process of running routines and operations on the stack of a program written in a different language, requests information from the stack of the program, and receives information regarding the stack of the program. Executable 306 includes any software or code capable of controlling such processes. Executable 306 converts first programming commands 300 to an intermediate language. Executable 306 is a file that a computer can directly execute without having to be compiled or assembled. Executable 306 includes one or more first application programming interfaces (API) 310, a command line interface (CLI) 312, one or more first auxiliary modules 314 and one or more worker threads 316 coupled as shown.

Interfaces in system 30 may represent any port or connection, real or virtual, including any suitable hardware, software, or a combination of the preceding that allow first language scripts 300 to exchange information with other components of system 30.

First API 310 may include a control API or any appropriate API that facilitates the interaction between programming languages. In the illustrated embodiment, First API 310 represents a connection that initiates the process of testing the stack of a second language. First API 310 may also include interfaces that deliver commands from first language commands 300 to first auxiliary module 314.

CLI 312 includes or allows the coupling of any number or arrangement of any suitable input device as well as any suitable output device. CLI 312 includes a user interface thread that determines whether the command from the user executes first language commands 300. CLI 312 may receive an input from a user that includes commands designating what to test, execution commands, or any other suitable command.

First auxiliary module 314 converts the syntax and semantics of first language commands 300 to an intermediate language. First auxiliary module 314 may be any suitable module that may convert the syntax and semantics of a programming language with any suitable software or code.

Worker threads 316 interact with first auxiliary module 314 to convert the syntax and semantics of first language commands 300. Worker threads 316 may include any suitable software or code.

An object-oriented language (OOL) Native Interface 318 facilitates the interaction between executable 306 and object-oriented layer 308 within mediation layer 302. OOL Native Interface 318 may include any suitable interface that bridges the gap between a scripting language and an object-oriented language. For example, OOL Native Interface 318 may be a Java Native Interface. In the illustrated embodiment, system 30 uses OOL Native Interface 318 to integrate executable 306 and object-oriented layer 308. OOL Native Interface 318 determines how the second programming language, such as object-oriented language, integrates with first language commands 300, such as TCL scripts, that a user executes.

The harness also includes an object-oriented language (OOL) layer 308 that contains one or more second application programming interfaces (API) 320, one or more second auxiliary modules 322, and a message queue 324 coupled as shown. OOL layer 308 converts the intermediate language to a second programming language. For example, OOL layer 308 may be a Java layer and converts the intermediate language into Java. OOL layer 308 also flattens the objects into a series of characters and places the series of characters into message queue 324. OOL layer 308 also provides notification of the objects to executable 306. OOL layer 308 may include any appropriate software or code to implement the functions of OOL layer 308.

Second API 320 may include a control API or any appropriate API that facilitates the interaction between programming languages. Second API 320 may also include interfaces that deliver commands from executable 306 to OOL layer 308. For example, second API 320 may convert the syntax of an OOL to an intermediate language, C.

Second auxiliary module 322 converts the syntax and semantics of the second programming language to an intermediate language. Second auxiliary module 322 may be any suitable module that may convert the syntax and semantics of a programming language with any suitable software or code.

Message queue 324 stores the results of second API 320 and second auxiliary module 322 for later retrieval by executable 306. For example, message queue 324 may include a series of characters that results from flattening an object. Message queue 324 may include any suitable memory or storage that retains information for retrieval.

Endpoint 304 may be any combination of hardware, software, or a combination of the preceding that provides communication services to a user. Endpoint 304 may include, for example, Internet Protocol (IP) telephony devices, personal computers, call managers, proxies, or any other suitable device. IP telephony devices may include telephones, fax machines, computers running telephony software, gateway devices, or any other device capable of performing telephony functions in an IP network. Endpoint 304 includes a user interface 326, a processor 328, a network interface 330, and a memory 332 coupled as shown.

User interface 326 receives commands, data, or other suitable information from a user to enact processes of endpoint 304. From user interface 326, endpoint 304 may initiate calls, route calls, authenticate calls, or any suitable feature of endpoint 304. User interface 326 includes or allows coupling to any number and arrangement of input devices, such as microphones, keypads, pointing devices, and other suitable input devices, as well as any suitable output devices, such as speakers, displays, light indicators, or other appropriate output devices.

Processor 328 processes commands, data, or other suitable information of endpoint 304. Processor 328 may include a microprocessor, microcontroller, digital signal processor (DSP) or any other suitable hardware, software, or a combination of the preceding operable to execute instructions and manipulate data to perform operations.

Network interface 330 exchanges information. Such information may include media, signaling, or a combination of the preceding or control information with other networks, call managers, or other endpoints 304.

Memory 332 stores and facilitates retrieval of information used by endpoint 304. In the illustrated embodiment, memory 332 includes stack 334 and API 336. As an example, memory 332 may store information a user inputs into endpoint 304. Examples of memory 332 may include Random Access Memory (RAM), Read Only Memory (ROM), magnetic drives, disk drives, Compact Disk (CD) drives, Digital Video Disk (DVD) drives, removable media storage, other suitable data storage device, or any combination of the preceding.

Stack 334 is a set of protocol layers that work together to process any suitable protocol. In an embodiment, stack 334 may be a Java Session Initiation Protocol (SIP) stack that processes SIP messages. Stack 334 may include any software or code operable to process the protocol. Stack 334 includes one or more programming language Application Programming Interfaces (API) 336. API 336 may include a control API or any appropriate API that facilitates the operation of endpoint 304.

According to an example embodiment of operation, a user executes the harness to begin testing endpoint 304. In response to the execution of the harness, executable 306 creates CLI 312. Executable 106 also loads OOL layer 308 and stack 334 into memory 332 of endpoint 304. From CLI 312, a user may execute first language commands 300. Executing first language commands 300 initiates the exercise of first API 310. Additionally, executing first language commands 300 creates worker thread 316, which interacts with first auxiliary module 314. First auxiliary module 314 massages the information passed by first language command 300 to create an intermediate language. First auxiliary module 314 also activates second API 320 in OOL layer 308 through OOL Native Interface 318. Activating second API 320 in OOL layer 308 causes second auxiliary module 322 in OOL layer 308 to interact with second API 320. From the intermediate language created by first auxiliary module 314, second auxiliary module 322 creates appropriate second programming language objects and invokes appropriate methods on stack 334. In an embodiment, such methods include methods to test the functionality of endpoint 304. Once the methods have been invoked on stack 334, stack 334 calls back the appropriate methods in OOL layer 308.

To provide the resultant information to executable 306, second auxiliary module 322 in OOL layer 308 flattens the information into a series of characters and places the information in message queue 324. Executable 306 may retrieve the series of characters from message queue 324 using second API 320. The flattened objects are each assigned an identification that is part of the flat object. Executable 306 takes the resultant information and processes it further. In an embodiment, the additional processing by executable 306 may verify the functionality of stack 336. Executable 306 uses the object identification in subsequent operations to be performed on that object. In an embodiment, the object identification and the flattened object depict whether endpoint 304 is working properly.

Modifications, additions, or omissions may be made to system 30 without departing from the scope of the invention. Additionally, any suitable logic comprising software, hardware, other logic, or any suitable combination of the preceding may perform the functions of system 30.

FIG. 4 is a flowchart 40 of one embodiment of a method for interacting between programming languages. A user creates a mediation layer at step 400. The mediation layer facilitates the interaction between different programming languages. Upon creating the mediation layer, a command line interface is created at step 402. A command line interface may receive commands from a user. A Java layer is loaded and a stack is loaded into the memory of an endpoint at step 404. The command line interface receives commands from a user at step 406.

At decisional step 408, a determination is made whether the command includes executing scripts of a first language. If the command does not include executing a first language's scripts, a determination is made whether the command is to terminate the system at decisional step 410. If the command is to terminate the system, the application is terminated at step 412 and the method ends. However, if the command does not terminate the system, the command is executed at step 414 and continues to receive commands from a user at step 406.

If the command includes executing scripts of a first language at decisional step 408, the next command is read from the script at step 416. At decisional step 418, a determination is made whether the application programming interface (API) is supported. If the API is not supported, an error is returned to the user at step 420 and the method continues from step 406.

If the API is supported at step 418, the executable exercises the API at step 422. At step 424, the first language script is converted to an intermediate language. An auxiliary module massages the first language script, which may include a TCL script, to create the intermediate language, which may include C. Though the Java Native Interface (JNI), an API in the Java layer is activated at step 426. From the intermediate language created in step 424, a second programming language object is created at step 426. The second programming language invokes methods on the stack at step 430. The stack is located in an endpoint. In an embodiment, invoking methods on the stack allow the stack to be tested for functionality. The results from invoking the methods are flattened by an auxiliary module in the Java layer and stored in a message queue at step 432. The executable requests the results from invoking the methods at step 434 and processes the results at step 436. Processing the results further verifies the functionality of the stack. If the termination condition is met at decisional step 438, the script being processed is terminated at step 440 and the method continues receiving commands at step 406. If the termination condition is not met at step 438, the system continues reading commands from the script already executed at step 416.

The method described is only an example of interaction between programming languages. For example, the method supports any interaction between programming languages for any suitable purpose in addition to testing purposes. Modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the scope and spirit of this disclosure.

What is claimed is:

1. A method providing for interaction between programming languages, comprising:

executing a harness to test an endpoint;

loading a stack into the endpoint;

receiving a command to test the stack, wherein the command is written in a first programming language;

converting the first programming language to an intermediate language;

performing translations between the intermediate language and a second programming language to provide interaction between the first and second programming languages;

invoking methods written in the second programming language on the stack to test the endpoint, wherein invoking the methods determines functionality of the stack;

flattening results from invoking the methods on the stack into a series of characters, wherein the results depict functionality of the endpoint.

2. The method of claim 1, further comprising creating a command line interface operable to determine whether the command from the user executes scripts of the first programming language.

3. The method of claim 1, further comprising placing the flattened results from invoking the methods on the stack into a message queue.

4. The method of claim 3, further comprising:
retrieving the flattened results from the message queue;
processing the flattened results retrieved from the message queue to determine the functionality of the stack.

5. A computer readable medium including logic providing for interaction between programming languages, the logic operable to:
execute a harness to test an endpoint;
load a stack into the endpoint;
receive a command to test the stack, wherein the command is written in a first programming language;
convert the first programming language to an intermediate language;
perform translations between the intermediate language and a second programming language to provide interaction between the first and second programming languages;
invoke methods written in the second programming language on the stack to test the endpoint, wherein invoking the methods determines functionality of the stack;
flatten results from invoking the methods on the stack into a series of characters, wherein the results depict functionality of the endpoint.

6. The computer readable medium of claim 5, wherein the logic is operable to create a command line interface operable to determine whether the command from the user executes scripts of the first programming language.

7. The computer readable medium of claim 5, wherein the logic is operable to place the flattened results from invoking the methods on the stack into a message queue.

8. The computer readable medium of claim 7, wherein the logic is operable to:
retrieve the flattened results from the message queue;
process the flattened results retrieved from the message queue to determine the functionality of the stack.

9. A computer readable medium including logic providing for interaction between programming languages, the logic operable to:
execute a harness to test an endpoint;
receive commands in a first programming language to test the endpoint;
load a stack written in a second programming language into the endpoint;
facilitate interaction between the first programming language and the stack written in the second programming language, wherein the logic is further operable to test the functionality of the stack by invoking methods written in the second programming language on the stack, flatten results from invoking the methods on the stack into a series of characters, wherein the results depict the functionality of the endpoint, facilitate interaction between an executable and an object-oriented language layer.

10. The computer readable medium of claim 9, wherein the logic is operable to translate between programming languages.

11. The computer readable medium of claim 10, wherein the logic is operable to convert the first programming language to an intermediate programming language.

12. The computer readable medium of claim 11, wherein the logic is operable to deliver the received commands to the one or more first auxiliary modules.

13. The computer readable medium of claim 10, wherein the logic is operable to convert the intermediate programming language to the second programming language.

14. The computer readable medium of claim 13, wherein the logic is operable to deliver the commands from the executable to one or more second auxiliary modules.

15. The computer readable medium of claim 9, wherein the logic is operable to interact with one or more first auxiliary modules in the executable to provide interaction between programming languages.

16. The computer readable medium of claim 9, wherein the logic is operable to store the results of invoking methods on the stack, the message queue operable to provide the results to the executable.

17. A computer readable medium including logic providing for interaction between programming languages, the logic operable to:
execute a harness to test an endpoint;
load a stack into the endpoint;
receive commands written in a first programming language through a command line interface to test the endpoint;
test the functionality of the stack by invoking methods written in a second programming language on the stack;
flatten results from invoking the methods on the stack into a series of characters, wherein the results depict functionality of the endpoint;
facilitate interaction between an executable and an object-oriented language layer.

18. The computer readable medium of claim 17, wherein the logic is operable to deliver the received commands to one or more first auxiliary modules in the executable, the logic further operable to convert the first programming language to an intermediate programming language.

19. The computer readable medium of claim 17, wherein the logic is operable to deliver the commands from the executable to one or more second auxiliary modules in the object-oriented language layer, the logic is further operable to convert an intermediate programming language to the second programming language.

20. The computer readable medium of claim 17, wherein the logic is operable to interact with one or more first auxiliary modules to provide interaction between programming languages.

21. The computer readable medium of claim 17, wherein the logic is operable to store results of invoking methods on the stack, the logic is further operable to provide the results to the executable.

* * * * *

UNITED STATES PATENT AND TRADEMARK OFFICE
CERTIFICATE OF CORRECTION

PATENT NO. : 7,406,683 B2  
APPLICATION NO. : 11/070015  
DATED : July 29, 2008  
INVENTOR(S) : Satish Kumar Kalidindi et al.

Page 1 of 1

It is certified that error appears in the above-identified patent and that said Letters Patent is hereby corrected as shown below:

Title page, item (75) Inventors, delete "Carl Linder" and insert --Carl Albert Lindner III--.

Signed and Sealed this

Fourth Day of November, 2008

JON W. DUDAS  
*Director of the United States Patent and Trademark Office*